United States Patent [19] … [11] Patent Number: 5,064,147
Noble et al. … [45] Date of Patent: Nov. 12, 1991

[54] UPWARDLY OPENING PLUG-TYPE DOOR FOR USE AS AN OVER-WING EMERGENCY HATCH

[75] Inventors: Donald R. Noble, Issaquah; Alex Maraghe, Seattle, both of Wash.

[73] Assignee: The Boeing Company, Seattle, Wash.

[21] Appl. No.: 478,430

[22] Filed: Feb. 12, 1990

[51] Int. Cl.⁵ .............................................. B64C 1/14
[52] U.S. Cl. .................................. 244/129.5; 292/36; 292/218; 292/DIG. 31; 49/200
[58] Field of Search ................. 49/199, 200, 209, 221, 49/225, 360; 292/218, 36, DIG. 31, DIG. 62; 244/129.4, 129.5

[56] References Cited

U.S. PATENT DOCUMENTS

| | | | |
|---|---|---|---|
| 2,664,597 | 1/1954 | McKee et al. | 20/16 |
| 3,412,423 | 11/1968 | Binns | 49/200 |
| 3,423,877 | 1/1969 | Merry | 49/211 |
| 3,440,762 | 4/1969 | Olsson | 49/209 |
| 3,453,778 | 7/1969 | Daugirdas | 49/214 |
| 3,585,757 | 6/1971 | Ritchie | 244/129.5 |
| 3,802,125 | 4/1974 | Baker | 49/360 |
| 4,106,729 | 8/1978 | Bergman et al. | 244/137 P |
| 4,125,235 | 11/1978 | Fitzgerald et al. | 244/129.5 |
| 4,248,016 | 2/1981 | Pecchioni | 49/200 |
| 4,375,876 | 3/1983 | Stewart | 244/129.5 |
| 4,470,566 | 9/1984 | Fitzgerald | 244/129.5 |
| 4,479,622 | 10/1984 | Howse | 244/129.5 |
| 4,601,446 | 7/1986 | Opsahl | 244/129.5 |
| 4,720,065 | 1/1988 | Hamatani | 244/129.5 |
| 4,944,473 | 7/1990 | Kallies | 244/129.5 |

Primary Examiner—Joseph F. Peters, Jr.
Assistant Examiner—Linda L. Palomar
Attorney, Agent, or Firm—Bruce A. Kaser

[57] ABSTRACT

A door latching and lifting mechanism for use on an aircraft as an escape hatch. The door (10) is an upwardly opening plug-type door. Its latching mechanism (12) consists of a torque tube (80) and handle (90), both of which are carried by the door (10). Pulling on the handle (90) rotates the tube (80) and causes door latch pins (113) to retract, thus releasing the door (10). A preloaded lift spring (48), connected to the door (10) by an overhead cable (18), automatically pulls the door upwardly as soon as the pins (113) retract.

10 Claims, 10 Drawing Sheets

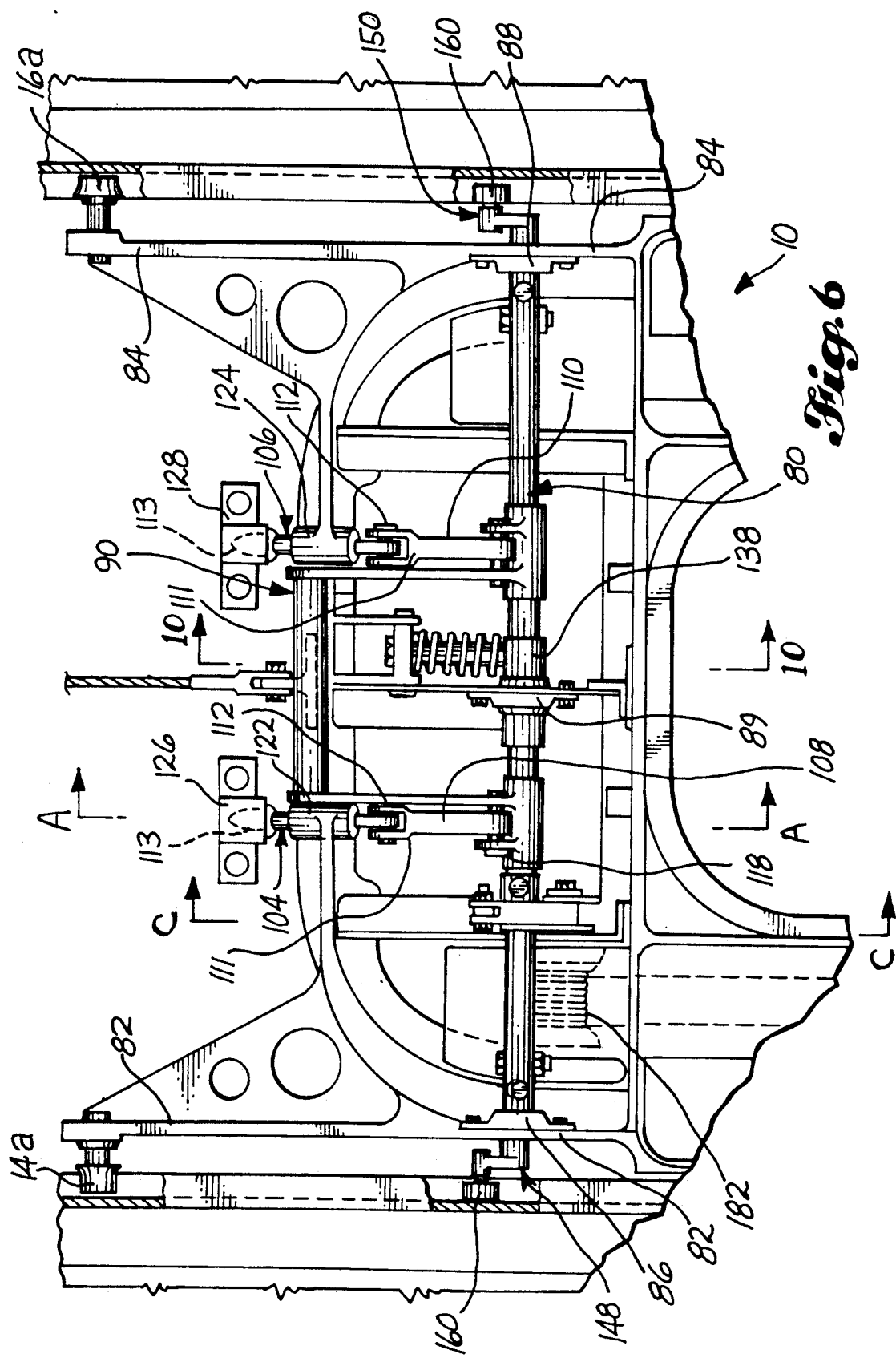

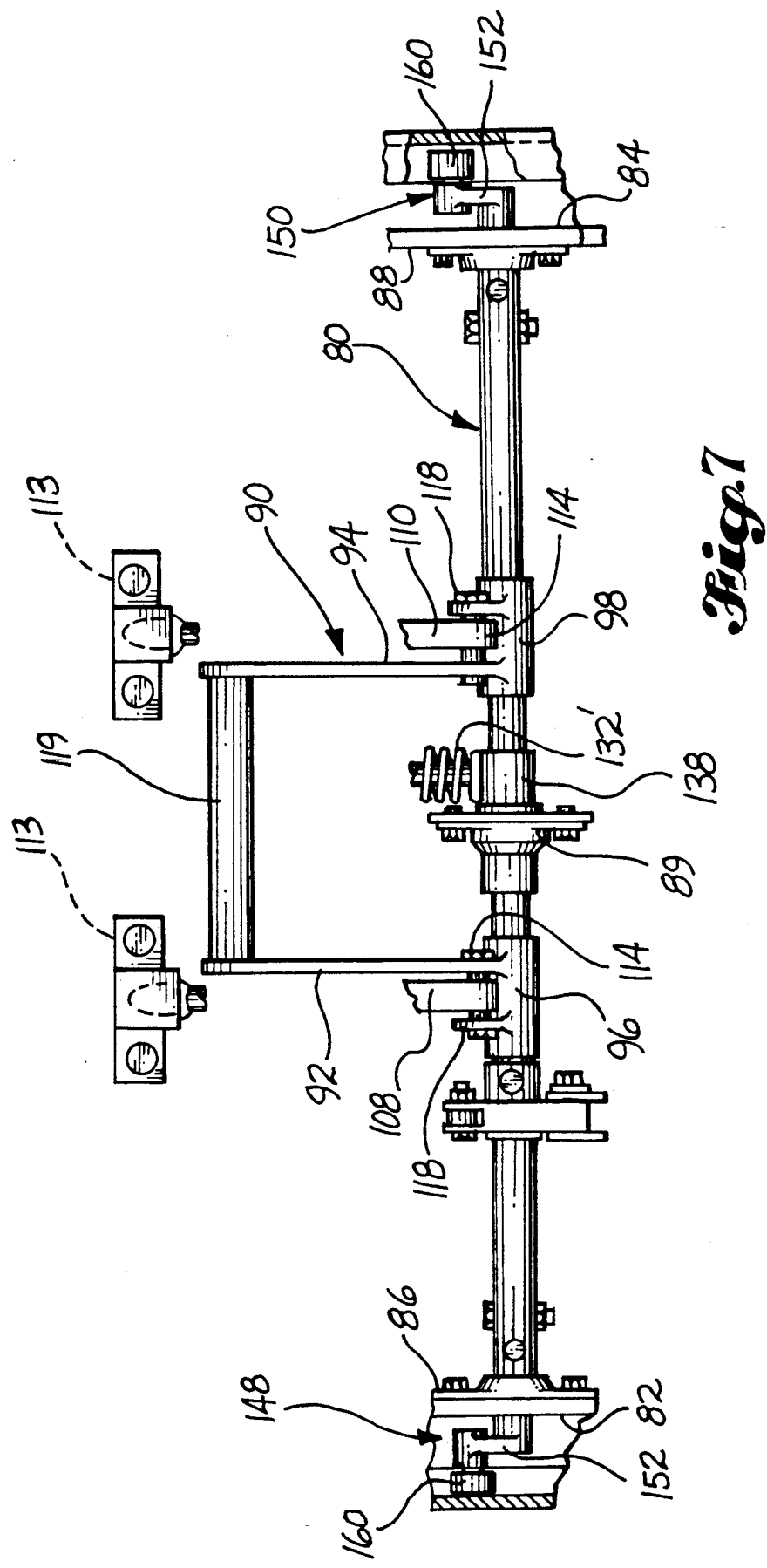

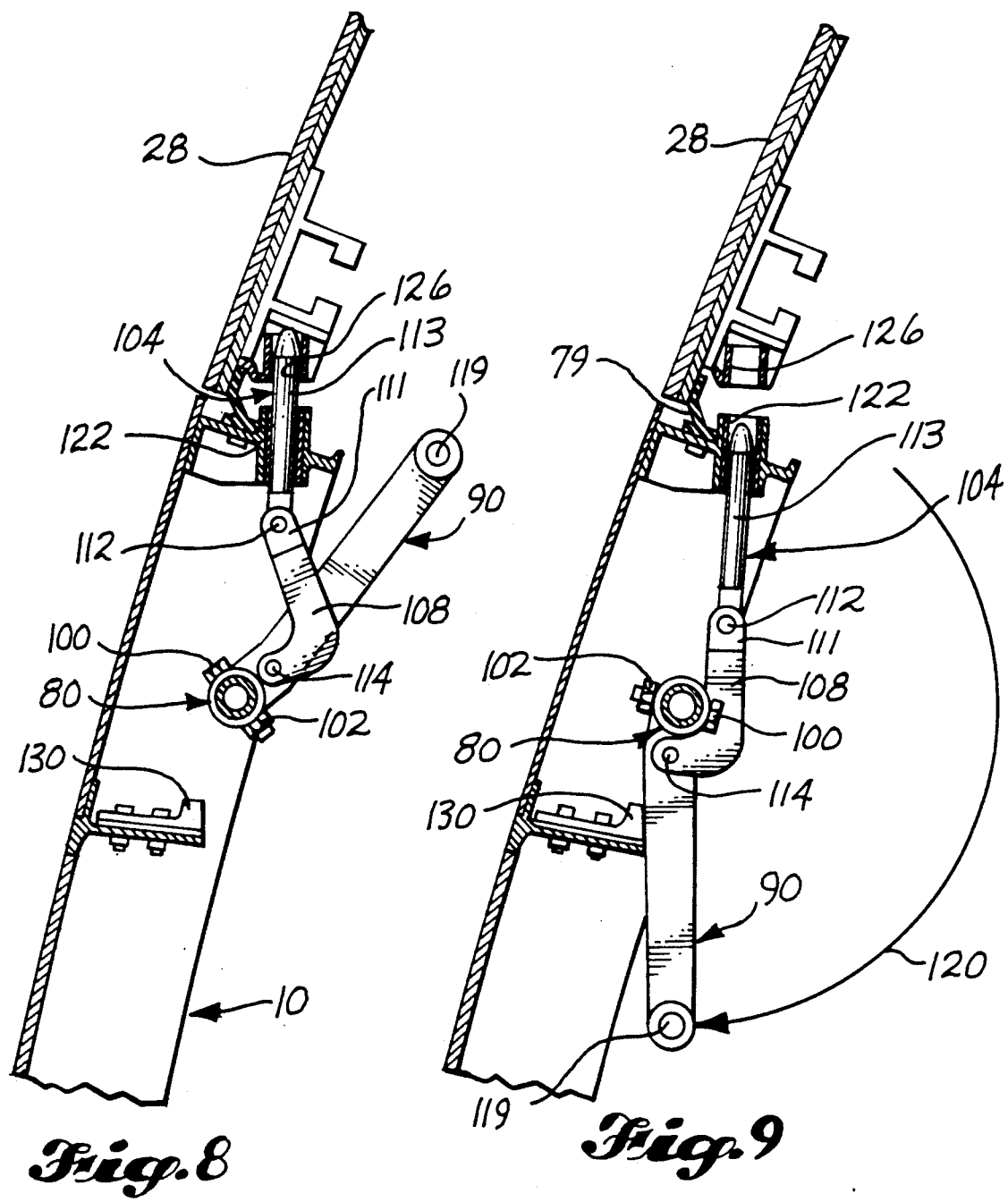

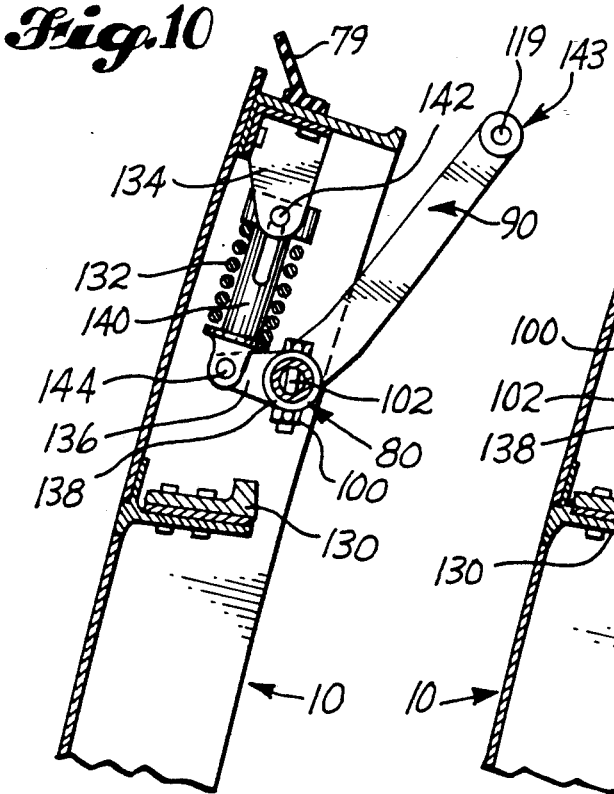
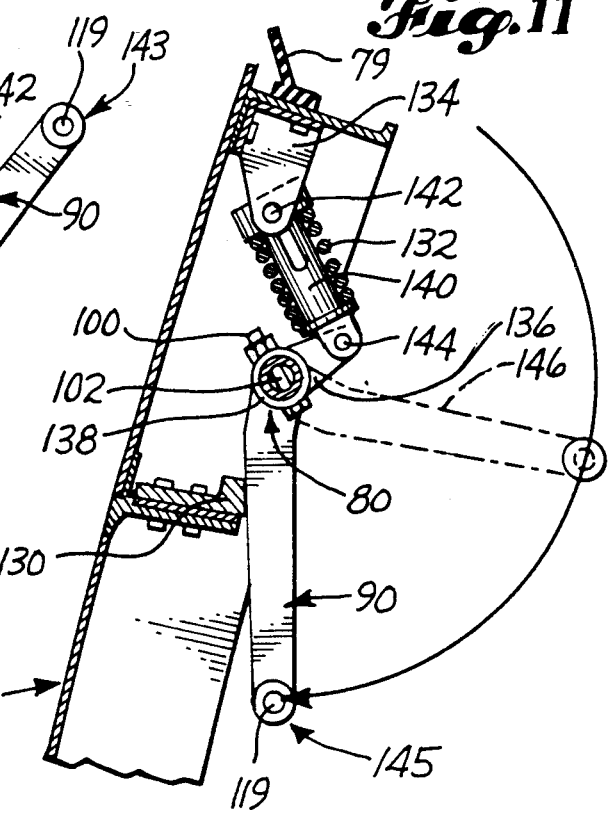
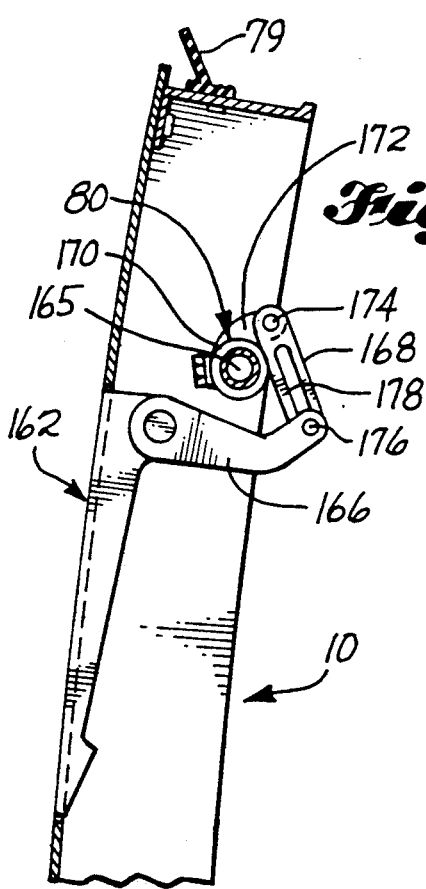
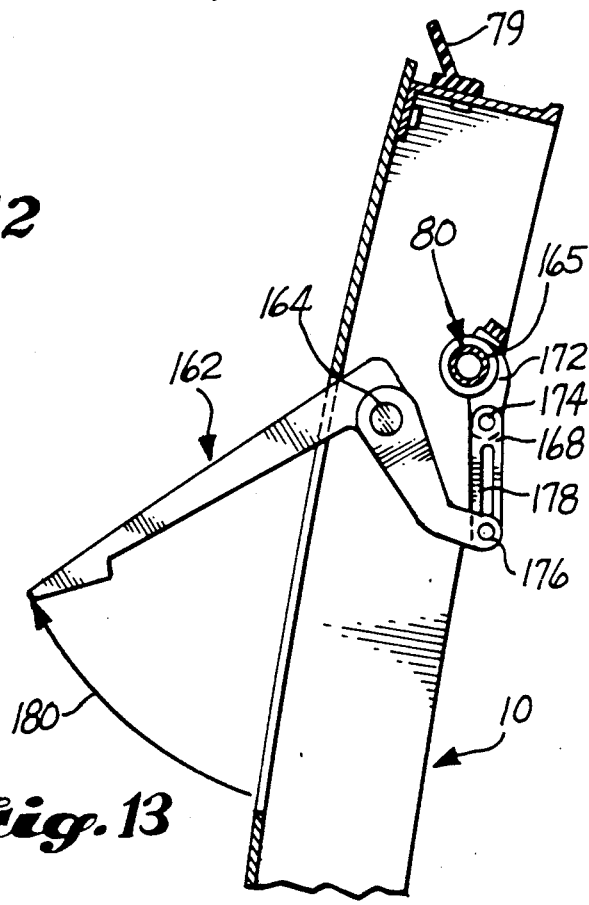

UPWARDLY OPENING PLUG-TYPE DOOR FOR USE AS AN OVER-WING EMERGENCY HATCH

DESCRIPTION

1. Technical Field

The invention disclosed herein generally relates to aircraft doors, and in particular, to plug-type sliding doors on aircraft which move upwardly and downwardly to respectively open and close.

2. Background Art

In order to expedite the evacuation of an aircraft through an emergency escape hatch, it is important that the hatch be easy to open and not obstruct passenger egress. One type of hatch currently in use throughout the aircraft industry is an "over-wing" hatch that employs a fully detachable or removable plug-type door. Although this type of door more than adequately meets reasonable aircraft safety requirements, and is approved by the relevant governmental agencies that regulate aircraft safety, it does have potential drawbacks.

For example, since the door completely detaches from the aircraft, it is therefore possible that it might get in the way of passenger egress for lack of space to store it. Also, in situations where a passenger having limited physical capability is sitting next to the door, such as an elderly person, for example, the passenger may not be physically able to take the quick action that might be needed in order to get the door open and out of the way during an emergency.

Aircraft manufacturers are extremely safety conscious and always take any reasonable measures available to them that will improve aircraft safety. Although, on the face of things, it would appear to be desirable to eliminate the above-described drawbacks associated with plug-type doors, the realities of designing aircraft do not necessarily make it possible to discard this particular design. Usually there are practical trade-offs, also related to safety, which prevent doing away with a certain design simply because it may have one or more undesirable characteristics. In the case of the plug-type door, despite its drawbacks, it is still considered to be inherently safer than other designs.

Some of the previous attempts at improving emergency escape hatches have involved hinging an escape door at its bottom edge so that it swings open both outwardly and downwardly, similar to a drawbridge that is being lowered. This design does not have the above-described drawbacks of a plug-type door because it can be made to open easily in a manner that quickly gets it out of the way of the opening through the fuselage. However, it has its own characteristic drawbacks in that it requires bracing structure on opposite lateral sides of the door which tends to obstruct the path of evacuation after egress through the fuselage. The bracing structure also creates a much more complicated door system that potentially has a higher probability of mechanical failure.

The plug-type hatches currently in use are relatively simple in design and have a lower probability of mechanical failure. Therefore, balancing the pluses and minuses of alternative designs with those of the conventional plug-type hatch has resulted in the plug-type hatch being the better, safer design, notwithstanding its unique drawbacks.

A well-designed escape hatch should have several features. First, it must be extremely easy to open by anyone. Second, there must be nothing to impede opening the door quickly, and preferably, the door can be opened as quickly as possible. Third, the door must not obstruct passenger egress after it has been opened. Lastly, the door should not be a complex system prone to failure, but should be one that is simple in design and easy to implement on board an aircraft.

The emergency hatch system disclosed herein is proposed as an alternative to the plug-type hatches currently in use. Thus far, the present invention is untested and it is not known how it compares overall to the conventional plug-type hatch. Nevertheless, it is a different design that is patentably distinguishable over the prior art, and has certain advantages over the plug-type hatch, and other proposed emergency hatches as well. As will become apparent, the invention utilizes a form of plug-type door, but one which operates differently than current designs.

Other types of plug-type doors or hatches known to be in the prior art are disclosed in U.S. Pat. Nos. 4,479,622; 4,470,566; 4,875,876; 4,125,235; 3,802,125; 3,585,757; 3,453,778; 3,423,877; and 3,440,762. All of these patents disclose doors that are designed to be quickly opened and many have overhead hoisting mechanisms. This is also a key attribute of the present invention. One similarity between the present invention and at least some of these patents is that both utilize a form of counter-balancing mechanism for the door. A significant difference, however, is the unique handle and latch mechanism of the present invention, and the way it is used in combination with a counter-balancing lift mechanism.

SUMMARY OF THE INVENTION

The invention disclosed herein is used in conjunction with an upwardly opening plug-type door. The door is mounted to the fuselage of an aircraft by rollers attached to lateral sides of the door. The rollers are received and retained in parallel guide rails, one on each side of the door, which are fixedly mounted to fuselage wall structure. The door's rollers permit it to slide upwardly or downwardly along the rails for respectively opening and closing the door.

A lift mechanism automatically hoists the door after a passenger or other person unlatches it. Unlatching is accomplished through a latching mechanism that has a rotatable torque shaft extending horizontally across the door's width. Attached to the shaft is a handle that normally extends generally upwardly, and is in a position that is accessible by the passenger from the interior side of the door. To unlatch the door, the passenger simply reaches up and pulls down on the handle, which also rotates the torque shaft.

A pair of door latch pins are slidingly mounted to the door, near the door's upper edge, and are aligned so that their individual axes are generally perpendicular to the horizontal axis defined by the torque shaft. When the door is closed and latched, the ends of the extended pins are engaged in sockets that are fixedly connected to the aircraft fuselage immediately above the door, thus preventing it from moving inwardly and upwardly. Crank arms connect the torque shaft to the latch pins in a manner so that the arms pull and retract the pins in response to torque shaft rotation caused by pulling the door's handle down. Counter-rotation of the shaft causes the pins to extend when the door is to be latched.

As mentioned above, the torque shaft's handle is placed so that it is easy to reach by an aircraft passenger who sits next to the door. Pulling on the handle rotates the torque shaft in clockwise fashion from a first to a second position. Each end of the torque shaft has a bell crank arm with a rollered end. The rollered end of each arm is received or retained in the guide rail on its respective side of the door. This configuration enables the bell crank arms to provide a means for both initiating door opening movement, and for ensuring that the latch pins will subsequently remain retracted as the door opens.

The rollered ends of each bell crank arm rotate or rotationally sweep through a widened area inside its respective guide rail as the torque shaft rotates clockwise. Such widened area is located adjacent the end of the torque shaft when the door is in the closed position. It should be appreciated that each guide rail is normally sufficiently wide to only permit rolling track engagement with the door's rollers, and is not wide enough to permit the just-mentioned rotation of the bell crank arm. The rail's widened area, therefore, permits arm sweep in unimpeded fashion as the torque shaft rotates clockwise, but only when the door is closed.

After the bell crank arms have traversed most of their rotational sweep, a unique torque shaft spring causes the rollered end of each arm to be pressed against the outboard edge of the inner surface of its respective track. After the roller of the bell crank touches the track, the final few degrees of the crank's clockwise rotation cams the door inwardly. This action moves the upper pair of door rollers out of their detents and into the roller guide rails, thus allowing a counterbalance force, provided by the door's lift mechanism, to then move the door upwardly. Such spring is connected to the torque shaft in a manner so that it initially opposes the beginning of the torque shaft's rotation, but assists and actually pushes the shaft at the end of the rotation. This also helps to keep the latch pins retracted as the door moves upwardly.

During the door's upward movement, the rotated bell crank arms also move upwardly out of their respective guide rail's widened areas, with their ends rolling along the inside surfaces of the rails. The arms cannot return to their initial position until the door is once again returned to the closed position, because the rails are too narrow to permit the arms to sweep in reverse. In the closed position, the arms are once again in the rails' widened areas, and can thus sweep in reverse. This, of course, corresponds to counter-clockwise rotation of the torque shaft back to its first position.

The lift mechanism portion of the invention includes a pre-loaded spring that is located in a fuselage wall space adjacent one side of the door. This spring is connected to the upper side of the door by a cable and pulley network. The cable is connected to the door in a manner so that it travels or extends upwardly from the door a certain length that is at least equal to the distance which the door must travel to fully open. The pre-loaded condition of the spring causes it to act as a type of counterbalance, normally keeping the cable in tension. When the previously-mentioned latch pins are retracted by pulling on the door's handle, the spring automatically pulls the door upwardly in very quick fashion.

The door also has a second handle that is accessible from its exterior side. It is mounted to the door for rotation about a second axis that is parallelly offset from the torque shaft's axis of rotation. It is connected to the torque shaft by a handle crank arm that rotates correspondingly with rotation of the exterior handle, and a slotted link. The slotted link is pivotally attached to the torque shaft and slidingly attached to the handle crank arm. The link does not drive the handle crank arm in rotation when the torque shaft is rotated via the interior handle, but merely slides along the handle crank arm. However, when the exterior handle is rotated clockwise from outside the aircraft, the handle crank arm pulls on the link, correspondingly rotating the torque shaft and retracting the latch pins, thus allowing the door to be pulled open. A second handle spring is attached to the exterior handle in a manner so as to oppose its clockwise rotation, and to return the second handle to its normal position upon release.

One advantage of the present invention is that it provides a safe, highly reliable door latching mechanism that cannot be accidentally opened other than by pulling on the door's handle. Another advantage is that the door's lifting mechanism quickly pulls the door open and away from the portal opening in the fuselage wall which the door normally closes, and stores the door above the opening so that it cannot interfere with passenger egress.

The invention, including its various advantages, will become better understood upon consideration of the following description which is to be read in conjunction with the drawings.

BRIEF DESCRIPTION OF THE DRAWINGS

In the drawings, like reference numerals and letters refer to like parts throughout the various views, and wherein:

FIG. 6 is an enlarged fragmentary view of the upper portion of the door shown in FIG. 5;

FIG. 7 is a side view of a torque shaft and handle mechanism which is mounted to the door of FIGS. 5 and 6, but with the adjacent door structure removed;

FIG. 8 is a cross-sectional view of the upper part of the door shown in FIG. 6, and is taken along line A—A in FIG. 6;

FIG. 9 is a view like FIG. 8 but shows the door's interior handle rotated for retracting the door's latch pins;

FIG. 10 is a side cross-sectional view like FIGS. 8-9, but is taken along line B—B in FIG. 6, and shows a spring which both impedes and assists movement of the door's interior handle as it rotates the torque shaft of FIG. 7;

FIG. 11 is a view like FIG. 10, but shows the door's interior handle fully rotated for opening the door;

FIG. 12 is a view like FIGS. 8–11, but is taken along line C—C in FIG. 6, and shows the door's exterior handle;

FIG. 13 is a view like FIG. 12, but shows the door's exterior handle fully rotated for opening the door from the outside;

BEST MODE FOR CARRYING OUT THE INVENTION

Figure 1:
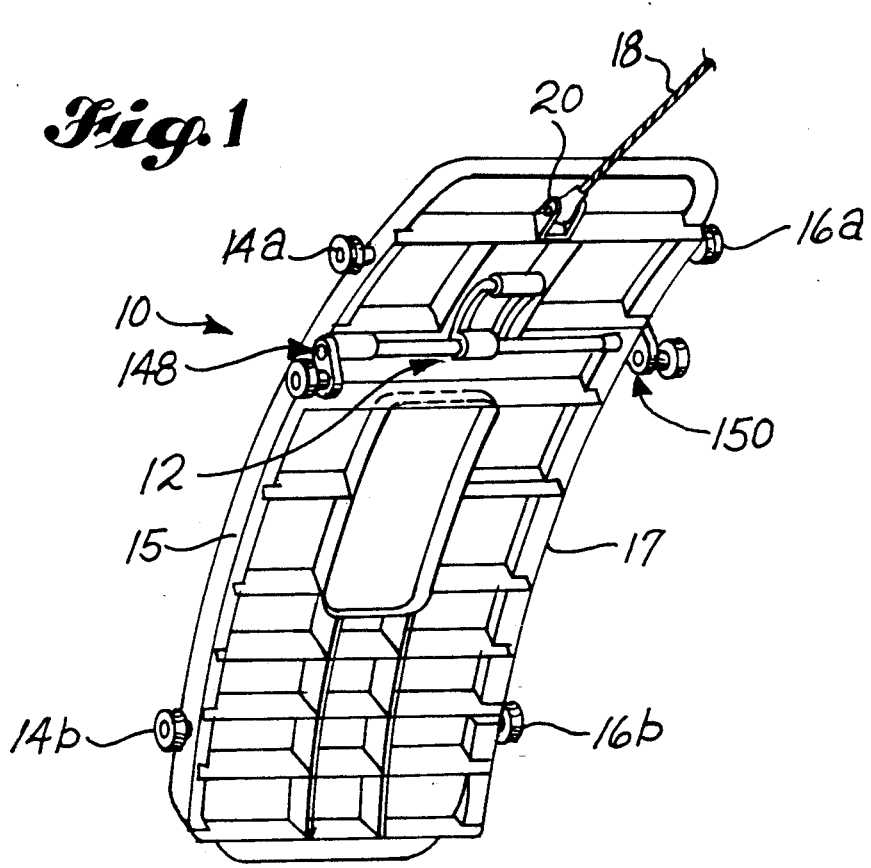
FIG. 1 is a pictorial view of a plug-type aircraft door in accordance with the invention as disclosed and claimed herein.

Referring first to FIG. 1 of the drawings, indicated generally at 10 is a plug-type door or hatch constructed in accordance with a preferred embodiment of the invention. The door 10 is shown separately from the fuselage structure to which it is mounted. It has a latch mechanism, indicated generally at 12, which will be further described later on in detail, and rollers 14a, 14b, 16a, 16b mounted to opposite lateral sides 15, 17. The door is opened upwardly in a manner that will also be described later by a cable 18 that is suitably connected to an upper part of the door, as shown at 20.

Figure 2:
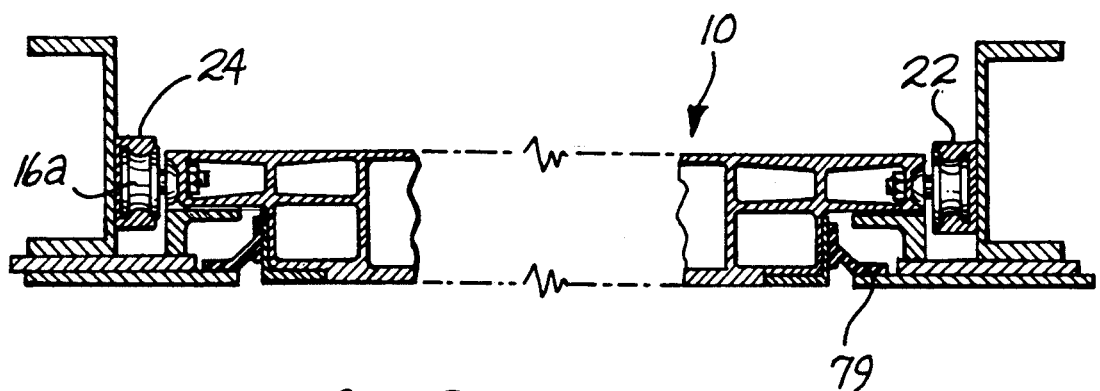
FIG. 2 is a cross-sectional view of the door shown in FIG. 1, and further shows the door in a closed position with respect to a portal or opening through a wall in the fuselage of an aircraft.
Figure 3:
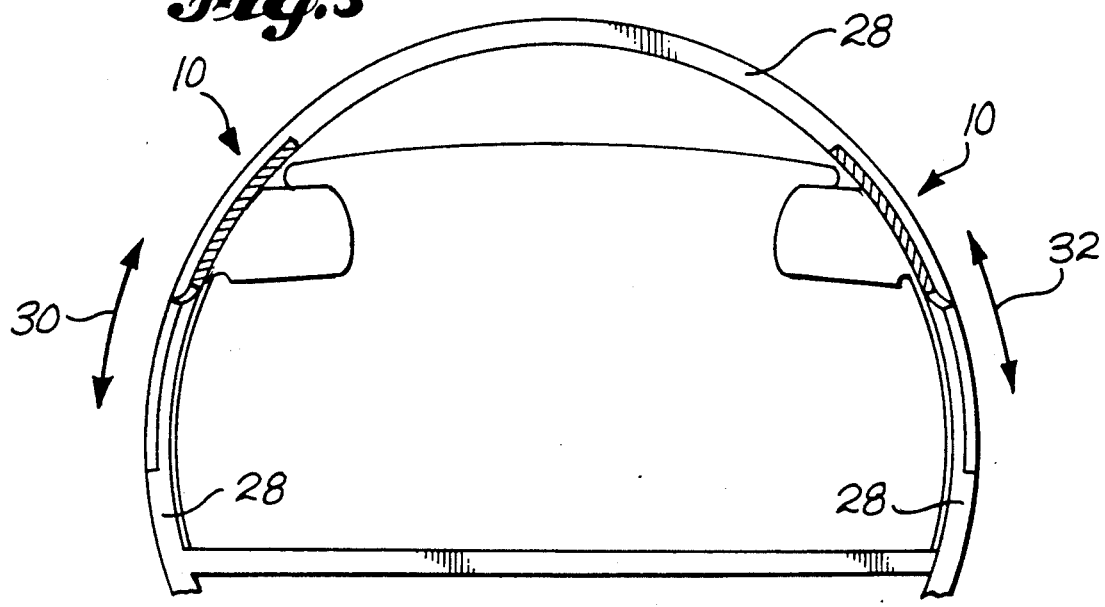
FIG. 3 is a schematic cross-sectional view of the upper half of an aircraft fuselage, and illustrates upward opening and downward closing movement of the door shown in FIGS. 1 and 2.
Figure 4:
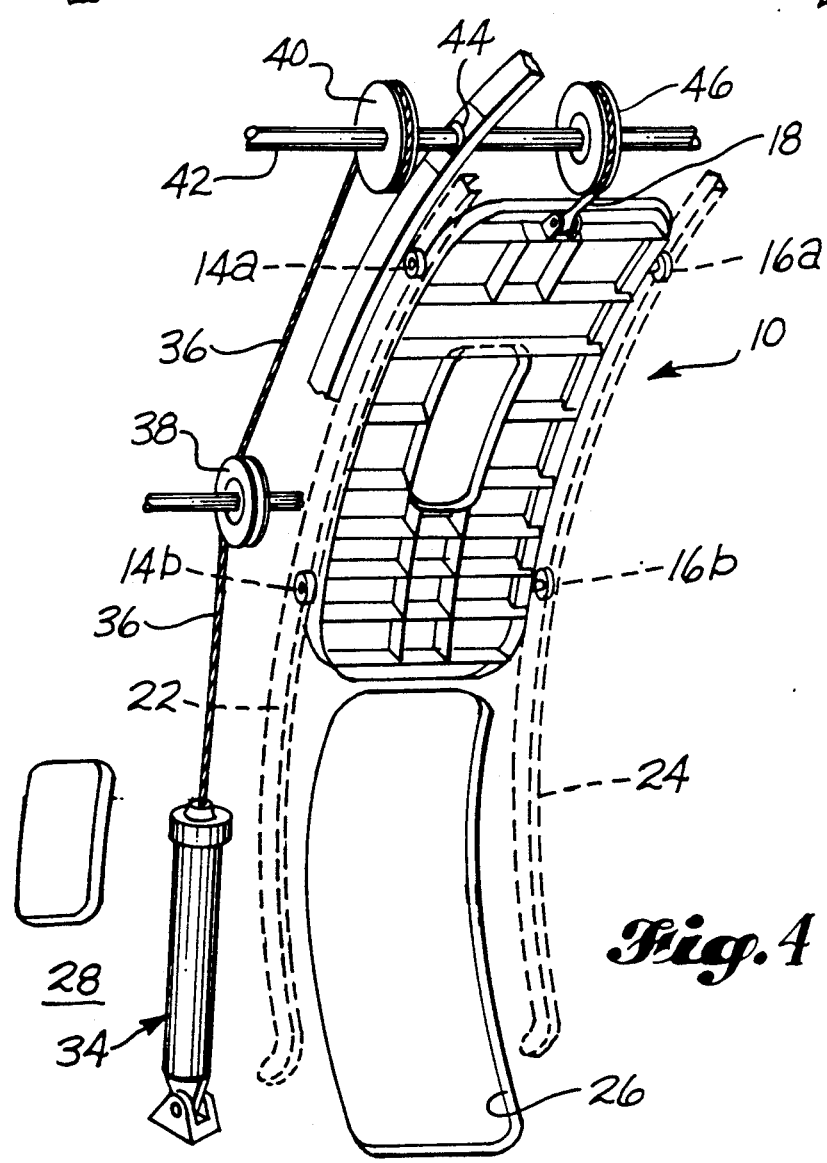
FIG. 4 is a pictorial view of the door shown in FIG. 1, and further shows a lift mechanism for automatically pulling the door upwardly open from the fuselage portal.

Referring now to FIGS. 2 and 4, the door's side rollers 14a, 14b, 16a, 16b are received in a pair of parallel guide rails 22, 24 located on opposite sides of the door 10. FIG. 4 illustrates how the door 10 is moved upwardly to create a portal or opening 26 in the fuselage wall 28 of an aircraft. As would be understood by a person having familiarity with aircraft escape hatches, the door 10 would probably be placed at various locations in an aircraft fuselage, although it is particularly well-suited for use over the wings. By way of example, FIG. 3 schematically illustrates opposing over-wing door locations, and arrows 30, 32 illustrate opening and closing movement of each door.

FIG. 4 illustrates one possible embodiment of a lift mechanism for the door 10. As mentioned above, the door 10 is lifted or hoisted by cable 18. Preferably, a form of counterbalance spring mechanism 34 is positioned in the fuselage wall adjacent one side of the door 10. This mechanism 34 maintains the cable 18 in tension via a pulley network. This is accomplished by a second cable 36 that extends upwardly from counterbalance 34, runs along idler pulley 38, and winds and unwinds around an overhead pulley 40. The latter is fixedly connected to a shaft 42 that is mounted for rotation at 44 above door 10.

A second overhead pulley 46, also fixedly connected to shaft 42, winds and unwinds cable 18 for lifting and closing the door 10. Normally, counterbalance 34 maintains cable 36 in tension, which continually places a winding torque on shaft 42 and creates a winding action by pulley 46 when the door 10 is unlatched. When this happens, cable 18 is immediately wound about pulley 46 and thereby automatically pulls the door 10 upwardly.

It should be appreciated that use of the term "counterbalance" herein is not made strictly within the narrow definition provided by some dictionaries. That is, by some interpretations "counterbalance" is taken to mean something that equally counteracts the force of something else. Here, the counteracting force, as provided by spring mechanism 24, could be more than equal to the force created by the weight of the door 10. For example, depending on the amount of counterbalancing spring force provided by spring mechanism 34, it may provide enough pulling force to lift the door upon unlatching without any substantial assistance by the passenger. Alternatively, it may function as a true counterbalance, meaning the passenger must still push the door upwardly, but with little effort since the door's weight is offset by the mechanism's pulling force.

Figure 14:
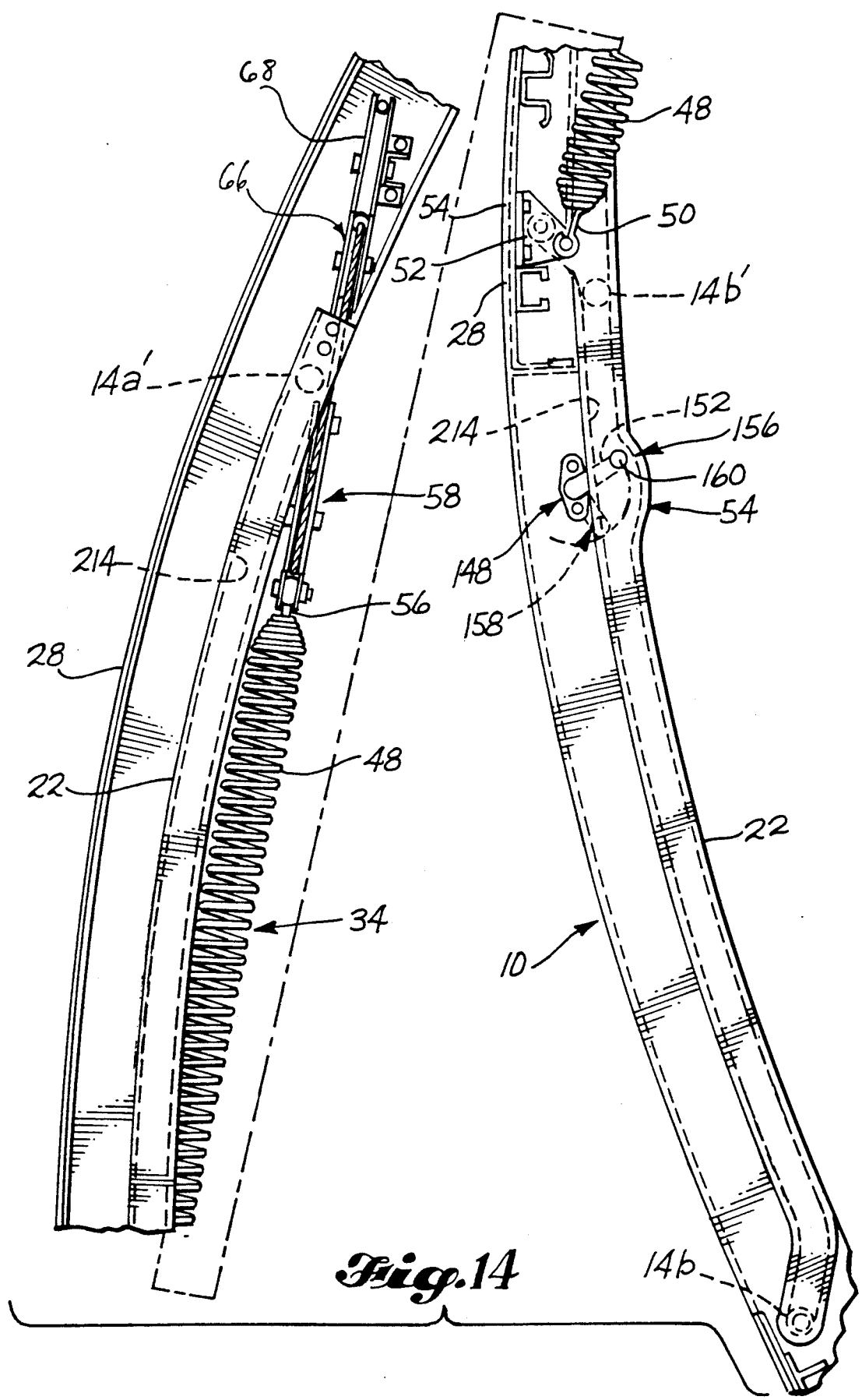
FIG. 14 is a side cross-sectional view taken through the aircraft fuselage, and shows one of the door's guide rails, and a spring mechanism that is used to automatically hoist or lift the door shown in FIG. 5.
Figure 15:
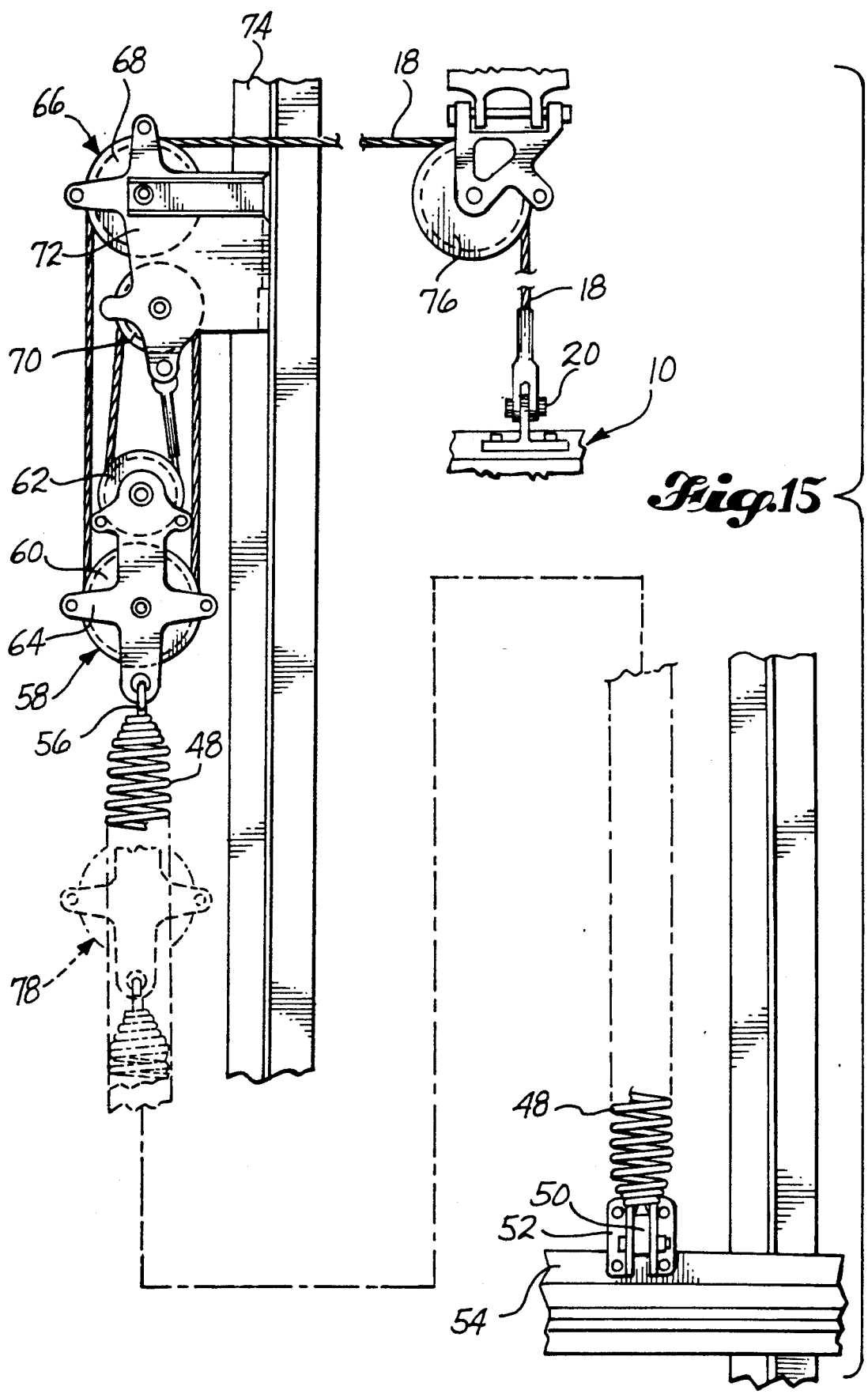
FIG. 15 is a fragmented view of a cable and pulley assembly which is used with the spring mechanism shown in FIG. 14 to hoist the door.

FIGS. 14 and 15 illustrate an alternative, and perhaps, preferable embodiment of the cable lift mechanism 34 shown in FIG. 4. There, a spring 48 is mounted to the fuselage wall structure 28. More specifically, the lower end 50 of the spring 48 is mounted to a bracket 52, the latter being directly fastened to part of a stiffening rib 54 on the fuselage 28. The bottom end 50 of the spring is positioned adjacent the upper end of door 10 when it is closed. Dashed lines 14a in FIG. 14, for example, indicate the position of the upper roller on one side of the door. Dashed lines 14a' indicate the position of the same roller after the door has been raised.

The upper end 56 of spring 48 is connected to a first double-pulley system 58 which is best seen in FIG. 15. This system 58 consists of two pulleys 60, 62 which are both rotatably mounted to a single pulley bracket 64. A second double-pulley system 66 is positioned above the first pulley systems 58, and similarly includes two pulleys 68, 70 rotatably mounted to a bracket 72. The bracket 72 is fixedly connected by welding or equivalent means to a fuselage stiffener 74.

The cable 18 extends upwardly from door 10 and around a freely turning overhead pulley 76. The overhead pulley 76 is located sufficiently above the door so that it provides the cable 18 with enough feed length to pull the door 10 completely open. The overhead pulley 76 is suitably connected to fuselage structure above the door. The cable travels from overhead pulley 76 and winds around the double pulley systems 58, 66 in the manner illustrated in FIG. 15.

Normally, spring 48 is in a preloaded condition, meaning it is stretched as the door 10 is closed and latched. Upon unlatching, the spring's stored energy creates a contracting force which pulls on the first pulley system 48 in a downward direction. As the door 10 opens, pulley system 48 is pulled down to the position indicated generally by dashed lines 78. Thus, as is apparent, the spring 58 acts as a form of counterbalance for the door and maintains cable 18 in tension until the door 10 is unlatched.

Figure 5:
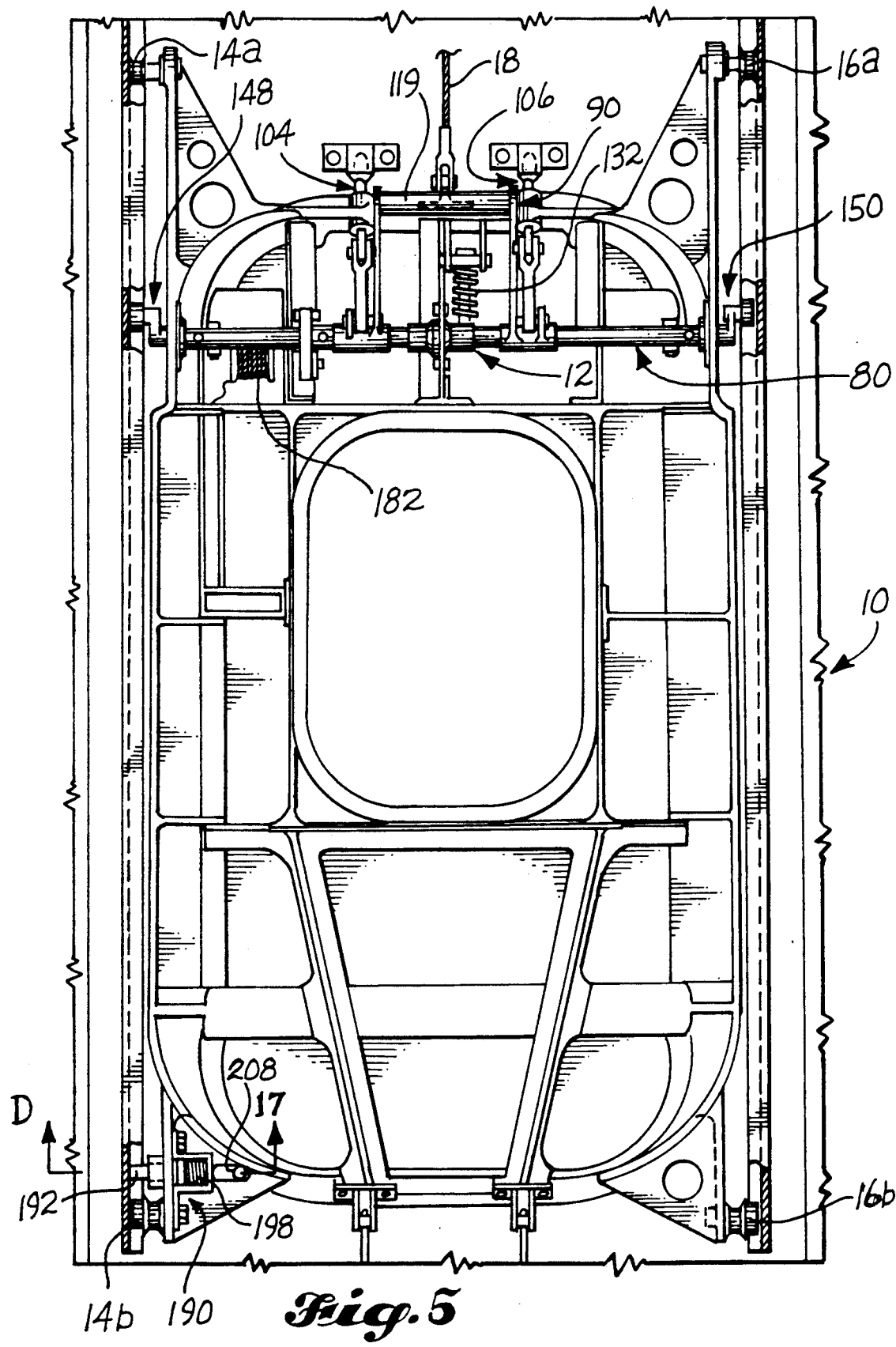
FIG. 5 is a detailed side view of the door shown in FIGS. 1, 2 and 4, looking at the door from an interior side.
Figure 17:
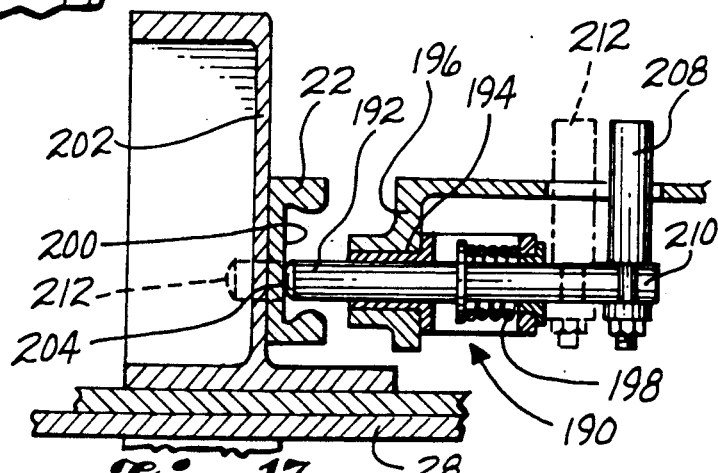
FIG. 17 is a fragmentary cross-sectional view, taken along line D—D in FIG. 5, and showing a door uplock mechanism.

Referring now to FIGS. 5 and 17, the door 10 has an uplock mechanism 190 that holds the door open at the end of its upward movement. This mechanism 190 includes a transversely extending pin 192 slidably mounted in a sleeve bushing 194, the latter being connected to door frame structure 196. (See FIG. 17). A spring 198 normally pushes pin 192 laterally outwardly against an inside surface 200 of track 22 (the track 22 is shown mounted directly to fuselage wall structure 202).

Figure 16:
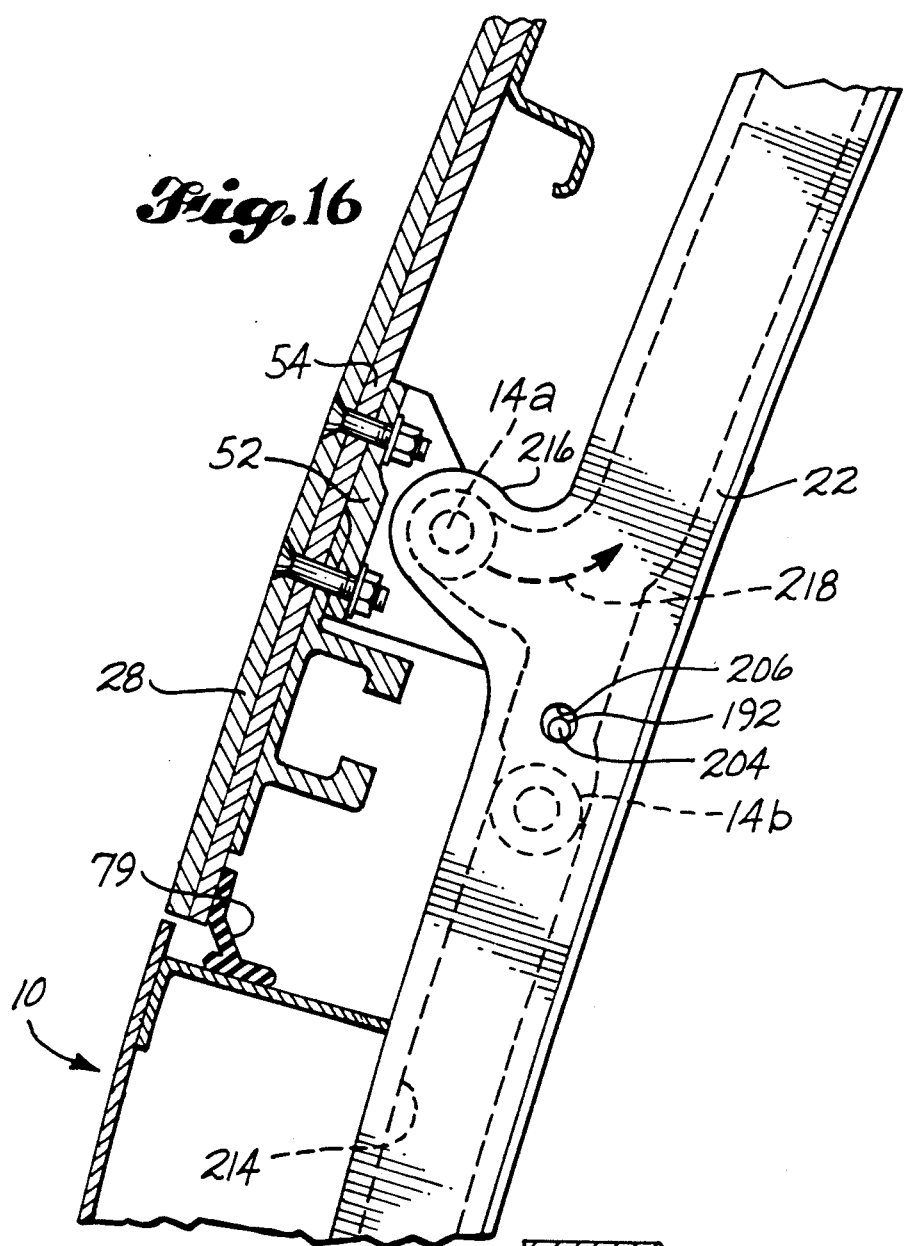
FIG. 16 is an enlarged fragmentary view showing a section of one of the door's guide rails, at the position where the door's upper roller is located when the door is closed.

As the door 10 moves upwardly, the end 204 of pin 192 slides against track surface 200 until the door 10 is fully open. There, and referring now to FIG. 16, the pin 192 comes into registration with an opening 206 through the side of track 22. Spring 198 pushes the pin 192 through the opening 206, thereby locking the door 10 open until the pin is retracted by pulling a handle 208, connected to an inner end 210 of the pin, laterally inwardly. Dashed lines 212 in FIG. 17 schematically indicate the position of the pin 192 when it is extended through opening 206 in FIG. 16.

FIG. 5 shows a preferred embodiment of the door's latch mechanism 12. As can be seen, the door 10 is a plug-type door which is fairly conventional in design. As would be familiar to the skilled person, it has an outer peripheral seal 79 that provides an airtight connection between door and fuselage (this is best seen in FIG. 2).

FIG. 7 shows a torque tube or shaft 80 rotatably mounted to the door 10 and extending across its entire transverse width. Preferably, the shaft 80 is hollow in order to save weight, and is mounted at each end to door side beams 82, 84, the latter defining the door's upper framework. This may be accomplished by conventional bearing housing assemblies 86, 88. The shaft is further rotatably mounted to the door in the center by another bearing housing assembly 89.

Connected directly to the torque shaft 80 is an interior door handle 90. Although the handle 90 may be connected to the shaft 80 in various ways that are equally suitable, FIG. 7 shows the lower arms 92, 94 of the handle 90 as being joined directly to sleeves 96, 98 the latter surrounding the shaft 80. These sleeves 96, 98 are each connected to the shaft 80 by a nut and bolt assembly 100, 102 (see FIGS. 8-9). Assemblies 100, 102 preferably extend through both sleeve and shaft.

Sleeves 96, 98 also connect a pair of latch pin assemblies 104, 106 to torque shaft 80. This is accomplished by linkages 108, 110 (see FIG. 6). Referring to FIGS. 8 and 9, for example, which show the left-hand latch pin assembly 104, each linkage 108, 110 is curved, and has an upper yoke end 111 connected by means of a pin 112 to a lower end of a latch pin 113. The other or lower end 115 of the linkage 108 is connected by another pin 114 to its respective sleeve, the sleeve surrounding torque shaft 80. The lower pin 114 is held in place on one side by a flange 118, that is connected directly to the sleeve, and on the other side by one of the handle's arms 92, 94.

Pulling the handle bar 119 of handle 90 downwardly, in the direction indicated by arrow 120 in FIG. 9, rotates shaft 80 in a clockwise direction from a first to a second position, and retracts the latch pin 113 of each latch pin assembly 104, 106. Each latch pin 113 is slidingly received in a sleeve bushing 122, 124 at the top of door 10. When the pins are extended, and when the door is in the closed position shown in FIG. 5, the ends of the latch pins 113 are received in overhead socket assemblies 126, 128 that are fixedly connected to the fuselage. These catch the pins in the manner shown in FIG. 8, and prevent the door from moving upwardly unless the pins 113 are first retracted. A handle stop 130 limits the rotational movement of the handle 90.

Handle and torque shaft rotation are both opposed and assisted by the same torque spring 132 interconnecting a door bracket 134 and another centrally-located torque shaft crank arm 136 (see FIGS. 10 and 11). The latter arm 136 is connected to the torque shaft 80 similarly to the way handle 90 is connected to the torque shaft. That is, by a centrally-mounted sleeve structure 138 that surrounds and is connected to the torque shaft 80 by a nut and bolt assembly 100, 102.

The spring 132 is held in place by a slotted guide pin 140. One end of this pin 140 is pivotably mounted at 142 to bracket 134. The other end is pivotably mounted at 144 to torque shaft arm 136. As the handle 90 is pulled downwardly, thus rotating shaft 80 clockwise, spring 132 is initially placed in compression, and opposes the handle's rotation until it is half-way between its initial position, as shown at 143 in FIG. 10, and its final position as shown at 145 in FIG. 11. For the sake of clarity, the half-way position is indicated by dashed lines 146 in FIG. 11. Thereafter, the spring 132 actually assists further movement of the handle because it is able to expand once the lower end 144 of slotted guide pin 140 moves past and over to the other side of torque shaft 80.

Referring again to FIG. 6, connected to the opposite ends of torque shaft 80, outside door beams 82, 84, are a pair of bell crank assemblies, indicated generally by arrows 148, 150. Referring now to FIG. 14, which shows the left-hand bell crank assembly 148, each one of assemblies 148, 150 has a bell crank arm 152 whose end rotationally sweeps through a widened inside area 154 of each arm's respective guide rail 22. This sweep, of course, corresponds to the rotation of torque shaft 80 as a result of pulling on handle 90.

Arrow 156 in FIG. 14 indicates the initial position of bell crank arm 152, and corresponds to the handle position shown at 143 in FIG. 10. This, of course, further corresponds to the latch pin position shown in FIG. 8. Arrow 158 in FIG. 14 indicates the second position of arm 152 after handle 90 has been pulled downwardly to the position indicated at 145 in FIG. 11. The end of the bell crank arm 152 has a roller which is indicated at 160. Sometimes this is referred to herein as a "rollered" end or rollered end portion. It rolls along the outboard inside surface 214 of the guide rail 22 as the door 10 moves.

When the bell crank arm 152 has reached the position indicated by arrow 158, the arm 152 has traversed most of its sweep. At this point, and referring back to FIGS. 10 and 11, the handle spring 132 is exerting a positive clockwise force on torque shaft 80, the torque shaft is nearly fully rotated, and the crank arm's rollered end 160 is exerting an inwardly-pushing force on the door 10. Completing the torque shaft's rotation causes the arm's rollered end 160 to pull the door's upper roller 14a (see FIG. 16) inwardly out of a detent section 216 of rail 22.

Detent section 216 is hidden from view in FIG. 14 by the connection of the lower end of spring 48 to airframe structure. It is well shown in FIG. 16, however. Its purpose is to hold the door's upper roller 14a against upward vertical movement until the roller is pulled out in the direction indicated by arrow 218 (FIG. 16), by the previously-described crank arm action. The door's latch pins 113, of course, are simultaneously retracted in accordance with the torque shaft's rotation.

The normal width of guide rail 22 is sized only for rolling engagement with the door's side rollers 14a, 14b. Therefore, bell crank arm 152 (see FIG. 14) cannot return to its initial position after the door begins upward movement, because the rail is too narrow. The arm 152 therefore retains the position substantially shown at 158 in FIG. 14 as the door opens. Closing the door brings the bell crank arm 152 back into position adjacent the widened guide rail area 154, and handle 90 may then be pushed upwardly to reverse the rotational sweep of the bell crank arm 152. This, of course, also relatches the door.

The bell crank assemblies 148, 150 therefore have two functions: One, they encourage initial door-opening movement. Two, they ensure that the latch pins 113 will remain retracted at all times as the door is opening or closing, except when the door is in the completely closed position.

The handle 90 is an interior handle which is positioned for easy access by a passenger who is sitting next to the door 10. The door 10 also has an exterior handle 162 which is illustrated in FIGS. 12 and 13. This handle 162 is mounted to the door about an axis 164 that is parallelly offset from the axis 165 defined by torque shaft 80.

Connected to the exterior handle 162 is a crank arm 166 that extends generally inwardly. This arm 166 is further connected to the torque shaft 80 by means of a slotted linkage 168. Similar to the previously-described sleeve connections 96, 98 for the interior handle 90, another sleeve 170, which is fixedly connected to the torque shaft 80, has a flange portion 172. One end of slotted linkage 168 is also connected to this flange 172 by a pin 174. The linkage's other end is connected to the handle crank arm 166 by a pin 176. When the door 10 is opened from the inside, by pulling interior handle 90 downwardly, torque shaft 80 rotates in clockwise fashion, and the slot 178 of linkage 168 merely slides along pin 176 without moving handle crank arm 166. In other words, unlatching the door 10 from the inside will not cause any movement of the exterior handle 162. However, when the door is opened from the outside, exterior handle 162 is pulled upwardly or rotated clockwise in the manner indicated by arrow 180 in FIG. 13. This causes the handle crank arm 166 to pull on the inside end of slot 178. In turn, flange 172 is pulled and rotates torque shaft 80 clockwise (and also causes interior handle 90 to rotate downwardly), thus unlatching the door in the same manner as described previously.

A second spring 182 (see FIG. 6) is suitably mounted inside door 10 to oppose upward movement of the exterior handle 162, and to return it to its initial position, as shown in FIG. 12, immediately upon the handle's release. Of course, as should be apparent, this second spring 132 does not operate similarly to torque spring 132 shown in FIGS. 10 and 11. Slotted linkage 168 permits the exterior handle to be returned to its normal position even though the interior handle 90 is in the position shown in FIG. 11.

The description presented above sets forth the current best known mode for carrying out or practicing the invention. It is to be understood that the various mechanisms described above could be changed without departing from the spirit and scope of what is intended to be the invention. Therefore, the preceding should not be viewed in the limiting sense, but rather should be utilized to interpret the following patent claims. It is the claims, of course, which limit the legal scope of any patent.

What is claimed is:

1. A latching mechanism for use on board an aircraft in connection with an upwardly opening plug-type door system, said door system including a door having laterally mounted side rollers, and a pair of substantially parallel guide rails mounted to the fuselage of said aircraft on laterally opposite sides of said door, said door's side rollers being in rolling engagement with said rails, for guiding upward opening and downward closing movements of said door, the latching mechanism comprising:

a torque shaft rotatably mounted to said door and extending transversely across said door;

a handle connected to said torque shaft for rotating the same, said handle being accessible from an interior side of said door, and wherein said torque shaft and said handle are both carried by said door as it opens and closes; and at least one latch pin member retractably mounted to said door adjacent an upper portion of said door, said latch pin member being axially movable in a direction that is generally perpendicular to the axis of rotation of said torque shaft, and said latch pin member being connected to said torque shaft in a manner so that said pin member retracts in response to clockwise rotation of said torque shaft, said pin member being normally extended when said door is closed, and in such position, said pin member being in engagement with a catch that is fixedly connected to fuselage structure immediately above said door, to prevent upward opening movement of said door, and wherein said clockwise rotation of said torque shaft includes clockwise rotation of said torque shaft from a first to a second position, and including a spring connected to said torque shaft in a manner so that said spring first opposes at least the beginning of said clockwise rotation, and then assists at least the end of said clockwise rotation.

2. The mechanism of claim 1, including a bell crank arm connected to at least one end of said torque shaft, said bell crank arm having a rollered end portion that rotates about said torque shaft's axis of rotation, and rotationally sweeps along a radius through a certain inside area of one of said guide rails correspondingly with rotation of said torque shaft, but only when said door is in a closed position, said one guide rail having a normal width that is sized to provide rolling track engagement with said door rollers, and said certain inside area of said guide rail being wider than said guide rail's normal width, to permit said rollered end portion to rotationally sweep through said inside area.

3. The mechanism of claim 2, wherein said bell crank arm's rollered end is in rolling contact with said one guide rail as said door moves upwardly.

4. The mechanism of claim 2, including a separate bell crank arm connected to opposite ends of said torque shaft, each one of said bell crank arms having a rollered portion that rotates about said torque shaft's axis of rotation and rotationally sweeps along a radius through a widened inside area of that guide rail which is respectively on the same lateral side of said door as said bell crank arm.

5. The mechanism of claim 1, including an exterior handle that is accessible from outside said door, said exterior handle being rotatably mounted to said door and having a handle axis of rotation that is parallelly offset from said torque shaft's axis of rotation, and a handle crank arm that rotates, about said handle axis of rotation correspondingly with rotation of said exterior handle axis, and a slottted link pivotably attached to a flange portion of said torque shaft, and slidingly attached to said handle crank arm, in a manner so that said handle crank arm pulls said slotted link in response to rotation of said exterior handle, and further rotates said torque shaft, but said link does not drive said handle crank arm in rotation about said handle axis in response to any rotation of said torque shaft that is caused by movement of said interior handle.

6. The mechanism of claim 5, including a second spring connected to said exterior handle, and biased to oppose clockwise rotation of said exterior handle.

7. The mechanism of claim 1, wherein said catch is a socket opening connected to said fuselage, and wherein an outer end of said pin member is normally engaged with said socket opening when said door is closed.

8. The mechanism of claim 1, including a pair of latch pin members, each of which is retractably mounted to said door adjacent an upper portion of said door, said pin members being simultaneously axially movable in a direction that is generally perpendicular to the axis of rotation of said torque shaft, and said pair of pin members being connected to said torque shaft in a manner so that said pair of pin members simultaneously retract in response to clockwise rotation of said torque shaft.

9. The invention of claim 1, including a lift mechanism for automatically lifting said door after retraction of said at least one latch pin member, comprising:
counterbalance means positioned in the wall of said aircraft fuselage adjacent said door;
cable and pulley means interconnecting said counterbalance means and said door, including a cable connected to said door and extending upwardly through said fuselage wall from said door, for pulling said door upwardly, and wherein said counterbalance means normally tensions said cable in a manner so that said cable automatically pulls said door upwardly upon retraction of said latch pin member.

10. The mechanism of claim 9, wherein said counterbalance means includes a lift spring normally in a preloaded condition when said door is closed, said lift spring being operably connected to said cable and pulley means for maintaining said cable in tension while said door is closed.

* * * * *